(12) United States Patent
Yang et al.

(10) Patent No.: US 9,445,262 B2
(45) Date of Patent: Sep. 13, 2016

(54) AUTHENTICATION SERVER, MOBILE TERMINAL AND METHOD FOR ISSUING RADIO FREQUENCY CARD KEY USING AUTHENTICATION SERVER AND MOBILE TERMINAL

(71) Applicant: LG Uplus Corp., Seoul (KR)

(72) Inventors: Yeong Joon Yang, Goyang-si (KR); Nam Su Ha, Goyang-si (KR)

(73) Assignee: LG UPLUS CORP., Seoul (KR)

( * ) Notice: Subject to any disclaimer, the term of this patent is extended or adjusted under 35 U.S.C. 154(b) by 93 days.

(21) Appl. No.: 14/099,666

(22) Filed: Dec. 6, 2013

(65) Prior Publication Data

US 2014/0161258 A1 Jun. 12, 2014

(30) Foreign Application Priority Data

Dec. 10, 2012 (KR) .................. 10-2012-0143019
Dec. 10, 2012 (KR) .................. 10-2012-0143020

(51) Int. Cl.
*H04L 29/06* (2006.01)
*H04W 12/02* (2009.01)
*H04W 12/04* (2009.01)
*H04W 4/00* (2009.01)

(52) U.S. Cl.
CPC ............ *H04W 12/02* (2013.01); *H04W 12/04* (2013.01); *H04L 63/0853* (2013.01); *H04W 4/008* (2013.01)

(58) Field of Classification Search
CPC .............. H04L 63/08; H04L 63/0428; H04L 2463/102; H04W 12/06; H04W 4/008; H04W 88/02; H04W 12/04
See application file for complete search history.

(56) References Cited

U.S. PATENT DOCUMENTS

| | | | |
|---|---|---|---|
| 6,434,238 B1* | 8/2002 | Chaum et al. | 380/45 |
| 7,908,216 B1* | 3/2011 | Davis et al. | 705/41 |
| 8,196,131 B1* | 6/2012 | von Behren et al. | 717/168 |
| 8,731,472 B2* | 5/2014 | Choi et al. | 455/41.2 |
| 2004/0015948 A1* | 1/2004 | Sueyoshi et al. | 717/170 |
| 2004/0236957 A1* | 11/2004 | Durand et al. | 713/193 |
| 2005/0074122 A1* | 4/2005 | Fascenda | 380/258 |
| 2006/0101136 A1* | 5/2006 | Akashika et al. | 709/223 |
| 2008/0016351 A1* | 1/2008 | Fontana et al. | 713/169 |
| 2008/0022121 A1* | 1/2008 | Fu et al. | 713/185 |
| 2008/0208744 A1* | 8/2008 | Arthur et al. | 705/41 |
| 2008/0313464 A1* | 12/2008 | Fascenda et al. | 713/171 |
| 2009/0144204 A1* | 6/2009 | Hurry | 705/71 |

(Continued)

FOREIGN PATENT DOCUMENTS

| | | |
|---|---|---|
| EP | 875868 A2 * | 11/1998 |
| KR | 20070117420 A | 12/2007 |

(Continued)

OTHER PUBLICATIONS

KR Office Action dated Nov. 30, 2015 as received in Application No. 10-2012-0143020.

*Primary Examiner* — Farid Homayounmehr
*Assistant Examiner* — Christopher C Harris
(74) *Attorney, Agent, or Firm* — Maschoff Brennan

(57) ABSTRACT

A method of for issuing a radio frequency (RF) card key of an authentication server is disclosed. The method includes receiving an encrypted serial number of a smart card from a mobile terminal, decrypting the encrypted serial number, extracting an RF card key corresponding to the decrypted serial number, encrypting the RF card key, and transmitting the encrypted RF card key to the mobile terminal.

17 Claims, 10 Drawing Sheets

(56) References Cited

U.S. PATENT DOCUMENTS

| | | | |
|---|---|---|---|
| 2009/0309715 A1* | 12/2009 | Kao | G06Q 20/352 340/539.11 |
| 2011/0078081 A1* | 3/2011 | Pirzadeh et al. | 705/44 |
| 2012/0095852 A1* | 4/2012 | Bauer et al. | 705/16 |
| 2012/0130839 A1* | 5/2012 | Koh et al. | 705/26.1 |
| 2012/0144193 A1* | 6/2012 | Le Saint | H04L 9/3234 713/168 |
| 2012/0158593 A1* | 6/2012 | Garfinkle et al. | 705/64 |
| 2012/0284787 A1* | 11/2012 | Clemot et al. | 726/7 |
| 2012/0290478 A1* | 11/2012 | Crofts et al. | 705/44 |
| 2012/0303483 A1 | 11/2012 | Lee et al. | |
| 2013/0086375 A1* | 4/2013 | Lyne et al. | 713/153 |
| 2013/0139230 A1* | 5/2013 | Koh et al. | 726/5 |
| 2013/0262317 A1* | 10/2013 | Collinge et al. | 705/71 |
| 2014/0108256 A1* | 4/2014 | Bircher-Nagy et al. | 705/44 |

FOREIGN PATENT DOCUMENTS

| | | |
|---|---|---|
| KR | 10-2008-0104180 | 12/2008 |
| KR | 10-2009-0019576 A | 2/2009 |
| KR | 10-2011-0071201 A | 6/2011 |
| KR | 20120030169 A | 3/2012 |
| KR | 101191345 A | 10/2012 |
| KR | 10-2012-0131652 A | 12/2012 |
| KR | 10-2012-0131690 A | 12/2012 |

* cited by examiner

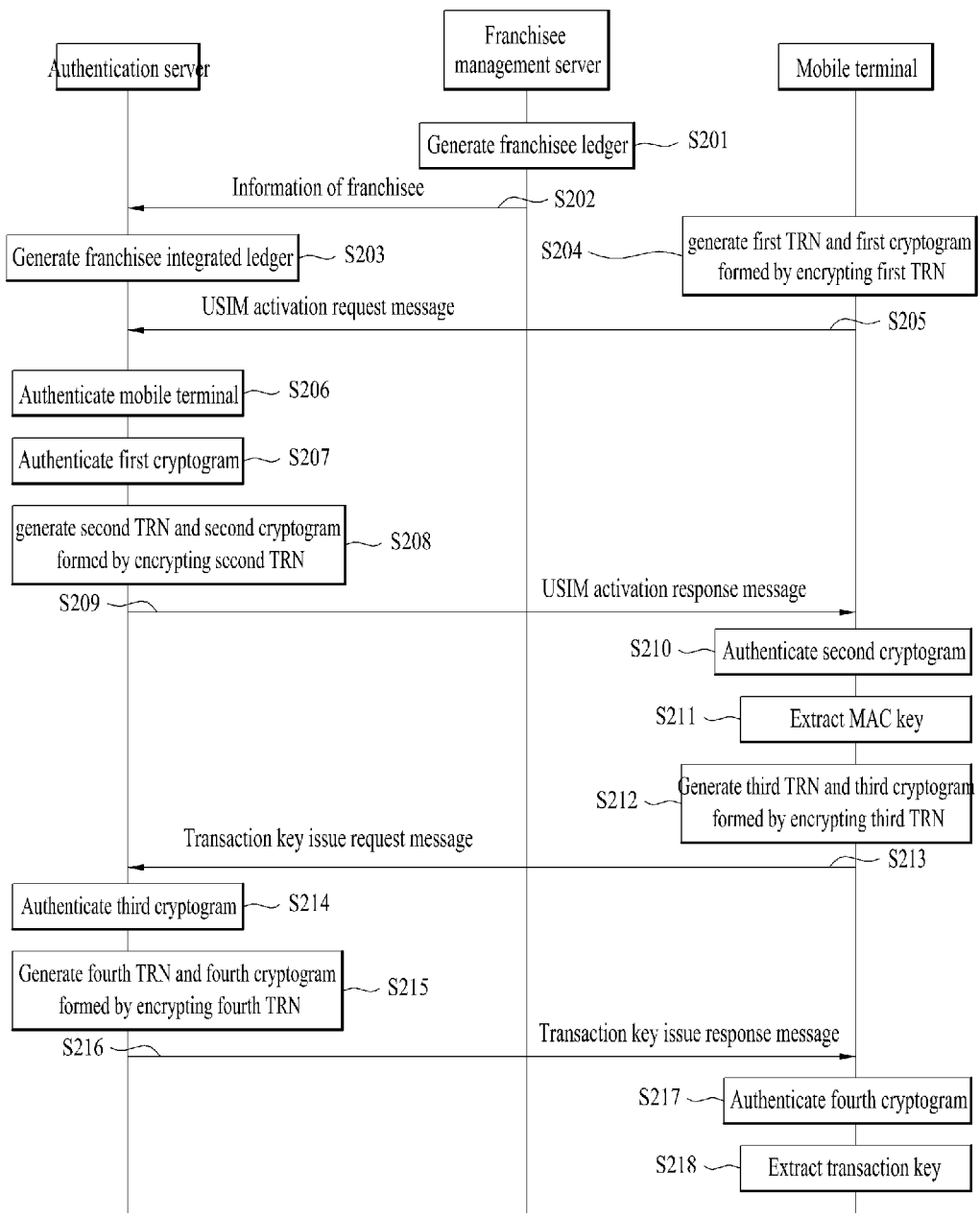

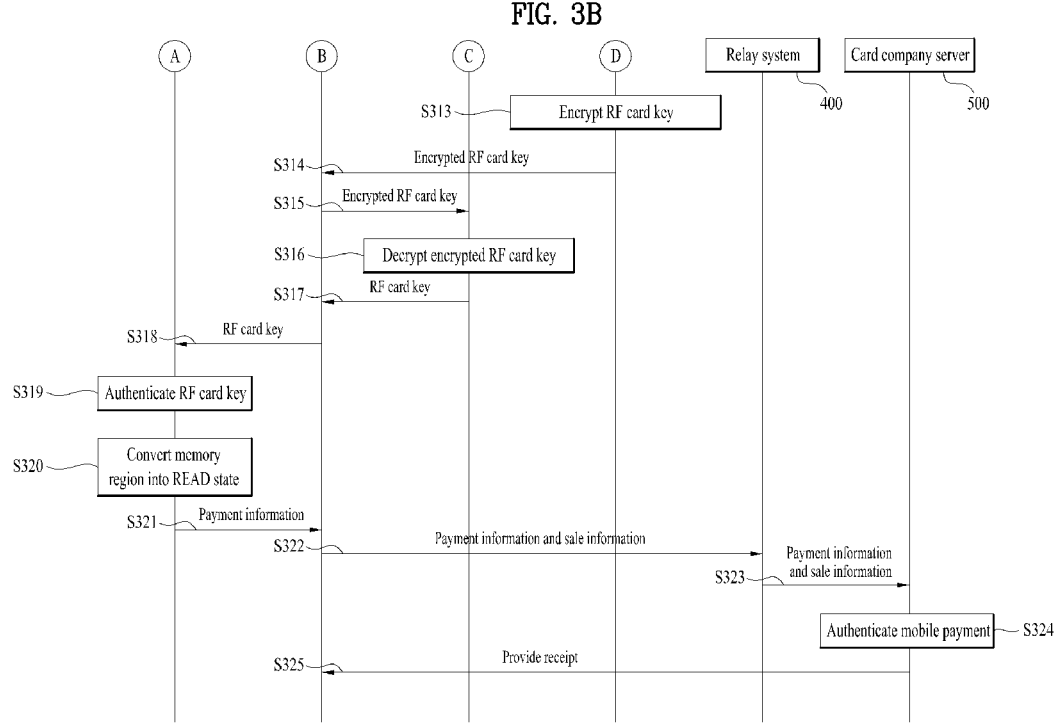

AUTHENTICATION SERVER, MOBILE TERMINAL AND METHOD FOR ISSUING RADIO FREQUENCY CARD KEY USING AUTHENTICATION SERVER AND MOBILE TERMINAL

This application claims the benefit of Korean Patent Applications No. 10-2012-0143019, filed on Dec. 10, 2012 and No. 10-2012-0143020, filed on Dec. 10, 2012 which are hereby incorporated by reference as if fully set forth herein.

BACKGROUND OF THE INVENTION

1. Field of the Invention

The present invention relates to an authentication server for issuing a radio frequency (RF) card key to a mobile terminal so as to perform mobile payment using a smart card.

2. Discussion of the Related Art

With the advent of handheld computers and smart phones, the age of using financial services anytime and anywhere has come. In particular, recently, there has been an increase in attempts to use smart phones in the form of a mobile wallet whereby payment on a smart phone is possible without carrying a credit card.

However, a conventional smart phone functions as only a requester that externally transmits payment information of a credit card, stored in a memory, and requests payment, but does not function as a payment processor that receives payment information from a smart card and processes the payment information. This is because it is inconvenient to install a secure application module (SAM) for authenticating the smart card in the smart phone in order to configure the smart phone as the payment processor. That is, in order to use the smart phone as the payment processor, the secure application module needs to be installed in all smart phones to be used as the payment processor. Furthermore, problems arise in that costs and manufacturer efforts are needed in order to install the secure application module for authenticating the smart card in all smart phones.

Accordingly, there has been an increase in the need for a method of enabling a smart phone to function as a payment processor even if a secure application module is not installed in the smart phone.

SUMMARY OF THE INVENTION

Accordingly, the present invention is directed to an authentication server, a mobile terminal, and a method for issuing a radio frequency key using the authentication server and the mobile terminal that substantially obviate one or more problems due to limitations and disadvantages of the related art.

An object of the present invention is to provide a mobile payment system for improving user convenience of a mobile terminal.

Another object of the present invention is to provide a mobile payment system for performing mobile payment using a mobile terminal and a smart card without an additional payment terminal.

Another object of the present invention is to provide a mobile terminal for processing mobile payment request from a smart card without installing a secure application module.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for issuing a radio frequency (RF) card key of an authentication server includes receiving an encrypted serial number of a smart card from a mobile terminal, decrypting the encrypted serial number, extracting an RF card key corresponding to the decrypted serial number, encrypting the RF card key, and transmitting the encrypted RF card key to the mobile terminal.

In another aspect of the present invention, an authentication server includes a smart card database for mapping and storing a serial number per smart card and a radio frequency (RF) card key, and an RF card key processor for decrypting the encrypted serial number, extracting an RF card key corresponding to the decrypted serial number from the smart card database, and encrypting the RF card key and transmitting the encrypted RF card key to a mobile terminal, upon receiving the encrypted serial number of the smart card from the mobile terminal.

In another aspect of the present invention, a method for issuing a radio frequency (RF) card key of a mobile terminal includes receiving an encrypted serial number from a smart card, transmitting the encrypted serial number to an authentication server, encrypting an RF card key to the serial number and receiving the encrypted RF card key from the authentication server, decrypting the encrypted RF card key, and extracting payment information from a memory region of the smart card using the RF card key.

In another aspect of the present invention, a mobile terminal includes a near field communication (NFC) module for data communication with a smart card, a wireless communication module for data communication with an authentication server for authenticating the smart card based on a secure application module (SAM), a first controller for control of a mobile payment process, and a universal subscriber identity module (USIM) for encrypting a serial number of the smart card, received from the smart card, and decrypting an encrypted RF card key received from the authentication server.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a flowchart illustrating an activation method of a mobile terminal;

FIGS. 3a and 3b illustrate a flowchart of a mobile payment method according to an embodiment of the present invention;

DETAILED DESCRIPTION OF THE INVENTION

Reference will now be made in detail to the preferred embodiments of the present invention, examples of which are illustrated in the accompanying drawings. The suffix "unit" of elements herein is used for convenience of description and thus can be used interchangeably and does not have any distinguishable meanings or functions.

A mobile payment system according to present invention may be categorized into a mobile payment system using a smart card and a mobile payment system between mobile terminals. The mobile payment system using the smart card will be described in detail with regard to Embodiment 1 described below. The mobile payment system between mobile terminals will be described in detail with regard to Embodiment 2 described below.

Embodiment 1

Mobile Payment System Using Smart Card

Figure 1:
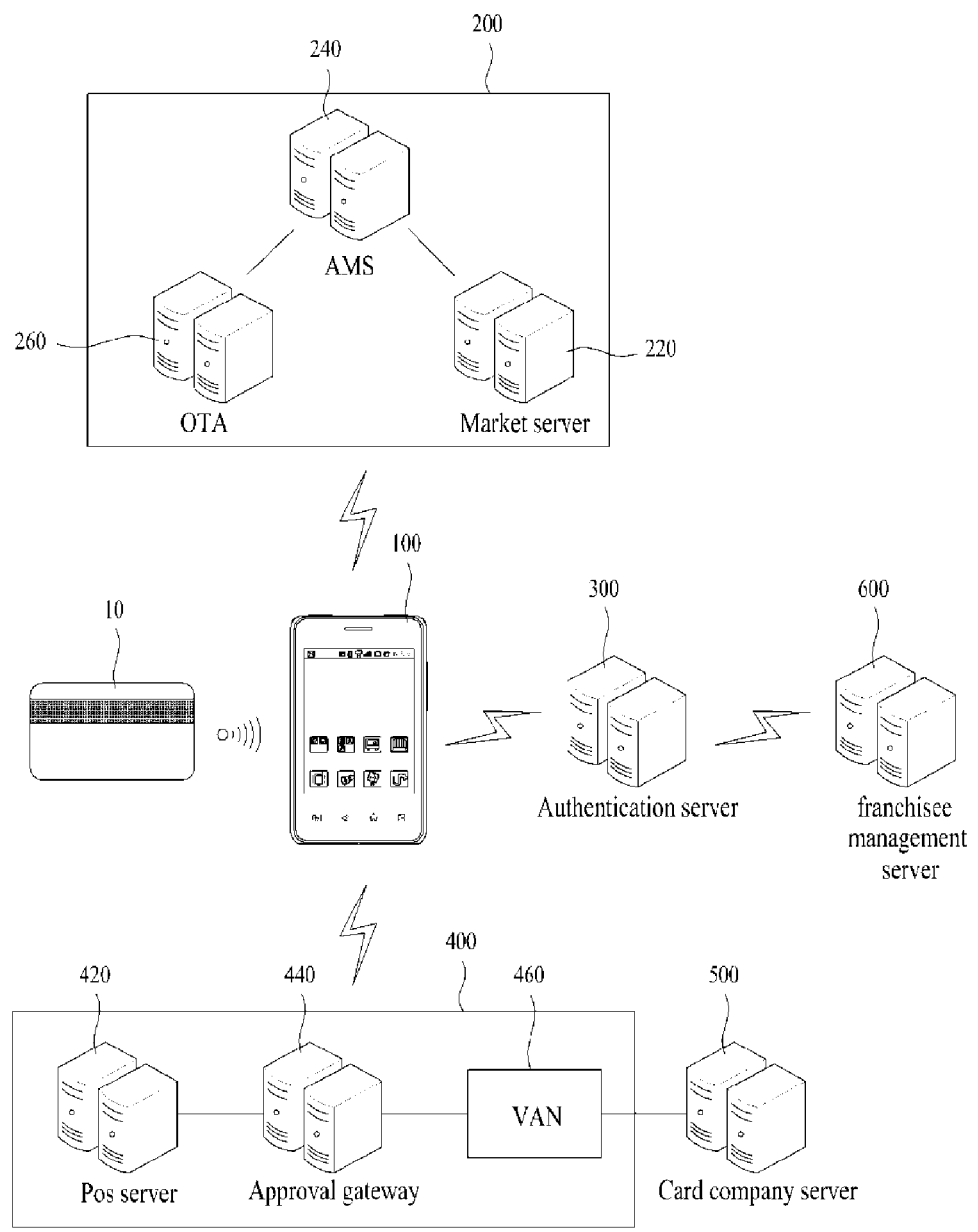
FIG. 1 is a schematic diagram of a mobile payment system according to an embodiment of the present invention.

FIG. 1 is a schematic diagram of a mobile payment system according to an embodiment of the present invention. Referring to FIG. 1, the mobile payment system according to the present invention may include a smart card 10, a mobile terminal 100 for short-range wireless communication, and an authentication server 300. To smoothly implant the present invention, the mobile payment system may further include an application system 200 for providing a payment program required for mobile payment to the mobile terminal 100, a relay system 400 for relaying payment information to a card company server 500 for payment approval, the card company server 500 determining whether mobile payment is approved, and a franchisee management server 600 that can be used to open the mobile terminal 100 for mobile payment.

The smart card 10 may store payment information which includes at least one of balance information and card number of the smart card 10. The smart card 10 may communicate with the mobile terminal 100 via short-range wireless communication. The smart card 10 may be include a plastic card which includes a IC (integrated circuit) chip and a USIM which is installed into the mobile terminal 100.

The mobile terminal 100 may execute a payment program for mobile payment via short-range wireless communication with the smart card 10. The mobile terminal 100 may store a radio frequency (RF) card master key that is used to encrypt a serial number received from the smart card 10 and decrypt an encrypted RF card key received from the authentication server 300. In addition, the mobile terminal 100 may further store a transaction key for double encryption of the serial number.

Here, the RF card key may be used to read the payment information stored in a memory region of the smart card 10 and may be derived from the RF card master key based on the serial number of the smart card 10. The mobile terminal 100 that decrypts the RF card key may read the payment information from the memory region of the smart card 10 using the RF card key.

Throughout this specification, the mobile terminal 100 may be, but is not limited to, at least one of a mobile POS device (or a mobile card terminal), a smart phone, a tablet personal computer (PC), a navigation device, a personal digital assistant (PDA), a laptop computer, a notebook computer, and an MP3 player.

The authentication server 300 may be used to authenticate the smart card 10 and the mobile terminal 100 based on encrypted information received from the mobile terminal 100. The authentication server 300 may include a secure application module (SAM) for authentication of the smart card 10. The authentication server 300 may decrypt the encrypted serial number using the RF card master key stored in the secure application module and generate an RF card key that can access the smart card 10 using the serial number decrypted through the secure application module.

A mobile payment system is configured in such a way that a secure application module is installed in each local device (e.g., a card payment device) for communication with the smart card 10 for mobile payment. However, according to the present invention, even if a secure application module is not installed in the mobile terminal 100 for communication with the smart card 10, a plurality of mobile terminals 100 can use a secure application module integrated through an authentication server 300, thereby reducing inconvenience of installing a secure application module per mobile terminal 100.

The application system 200 provides a payment program to the mobile terminal 100 such that the mobile terminal 100 functions as a POS device. The payment program provided to the mobile terminal 100 may include an application (hereinafter, referred to as a mobile POS application) executed by a first controller of the mobile terminal 100 and an applet including a cryptographic module driven by a second controller of a universal subscriber identity module (USIM). Thus, the application system 200 may include a market server 220 for providing a mobile POS application executed by the first controller of the mobile terminal 100, an applet management system (AMS) for managing the applet information and profile of a mobile communication company or an affiliated company thereof, and an over the air (OTA) server 260 for transmitting an applet to the USIM of the mobile terminal 100.

The market server 220 may provide an application to the mobile terminal 100 and may be a web server such as Play Store of Google, App Store of Apple, Blackberry World of Blackberry, Market-place of Microsoft, etc. or a web server (e.g., U+ Appmarket of U+, Ollehmarket of KT, T store of SK, etc.) managed by a mobile communication company. In addition, the market server 220 may be various web servers for providing an application.

The relay system 400 may relay payment information and sale information received from the mobile terminal 100 to the card company server 500. The relay system 400 may include a POS server 420 and an approval gateway 440. The POS server 420 manages sale information per mobile terminal 100 (or per franchisee) and transmits payment information to the approval gateway 440 in conjunction with the mobile terminal 100. The approval gateway 440 may transmit payment information received from the POS server 420 to a valuable access network (VAN) 460 to request payment approval.

The card company server 500 authenticates the smart card 10 and the mobile terminal 100 based on the payment information and sale information received from the mobile terminal 100 and determines whether mobile payment is approved. When the card company server 500 approves mobile payment, the card company server 500 may provide a receipt to the mobile terminal 100. In this case, the receipt may be provided to the mobile terminal 100 in the form of an in-app push message or a multimedia message service (MMS) including a receipt image, but the present is not limited thereto.

When the mobile terminal 100 is used for mobile payment, the franchisee management server 600 provides information required to open the mobile terminal 100 to the authentication server 300.

Before describing the detailed operation of the mobile payment system described with reference to FIG. 1, a method of activating the mobile terminal 100 for mobile payment will be described in detail. Here, the method of activating the mobile terminal 100 may be associated with a method of opening a kind of POS device such that the mobile terminal 100 reads the payment information from the smart card 10 and processes mobile payment.

FIG. 2 is a flowchart illustrating an activation method of a mobile terminal. For convenience of description, it is assumed that a USIM for storing an initial key is installed in the mobile terminal 100. In addition, it is assumed that the authentication server 300 stores an initial master key for activation of the mobile terminal 100, a message attestation code (MAC) master key for generation of a MAC used as a signature value for verification of a mobile payment transaction, and a transaction master key for mobile payment approval. Here, the initial key stored in the USIM may be derived from an initial master key using identity information of the USIM.

First, the franchisee management server 600 may issue a USIM to each franchisee and generate a franchisee ledger including information about a franchisee to which a USIM is issued (S201). Here, the information about the franchisee may include at least one of identity information of the mobile terminal 100 to which a USIM is issued and franchisee information (e.g., a name or position of the franchisee, etc.). Here, the identity information of the mobile terminal 100 may include at least one of a caller telephone number (CTN), an IMEI, an IMSI, a serial number, and a terminal ID (TID) of the mobile terminal 100, and the franchisee information may include at least one of the name or position of the franchisee. In this case, the TID of the mobile terminal 100 may be temporarily given by the franchisee management server 600 for convenience of identifying the mobile terminal 100. The franchisee management server 600 may provide the information of the franchisee to the authentication server 300 (S202).

The authentication server 300 may map franchisee ledgers of a plurality of franchisees registered in the franchisee management server 600 and identity information of the mobile terminal 100 to generate a franchisee integrated ledger, based on information about the franchisee, received from the franchisee management server 600 (S203).

Then, to activate a mobile payment function of the mobile terminal 100, the mobile terminal 100 may generate a first temporary reference number (TRN) through the USIM and encrypt the first TRN using the initial key to generate a first cryptogram (S204). Then, the mobile terminal 100 may transmit identity information of the USIM, identity information of the mobile terminal 100, and a USIM activation request message including the first TRN and the first cryptogram to the authentication server 300 (S205). Here, the identity information of the USIM may include a compromisable serial number (CSN). The identity information of the mobile terminal 100 may include at least one of CTN, IMEI, IMSI, serial number, and TID.

The authentication server 300 that receives the USIM activation request message from the mobile terminal 100 may authenticate whether the mobile terminal 100 is a rightful user of the USIM and the mobile terminal 100 is used in a rightful franchisee, based on the generated franchisee integrated ledger (S206). In detail, the authentication server 300 may authenticate the mobile terminal 100 according to whether there is a mapping relationship between the identity information of the mobile terminal 100 received from the mobile terminal 100 and the franchisee information received from the mobile terminal 100 in the franchisee integrated ledger.

Once authentication of the mobile terminal 100 is completed, the authentication server 300 may perform cryptogram authentication (S207). In detail, the authentication server 300 may encrypt the identity information of the USIM received from the mobile terminal 100 using the initial master key to generate a preliminary initial key and encrypt the first TRN received from the mobile terminal 100 using the generated preliminary initial key to generate a preliminary cryptogram. The authentication server 300 may perform the cryptogram authentication by comparing whether the preliminary cryptogram is equal to the first cryptogram received from the mobile terminal 100.

Once the cryptogram authentication is completed, the authentication server 300 may generate a second TRN and encrypt the identity information of the USIM to generate a message attestation code (MAC) key. When the MAC key is generated, the MAC key may be encrypted using the preliminary initial key to generate first encrypted data and the second TRN may be encrypted using the preliminary initial key to generate a second crypto gram (S208).

Then, the authentication server 300 may transmit a USIM activation response message including the second TRN, the first encrypted data, and the second cryptogram to the mobile terminal 100 (S209).

The mobile terminal 100 that receives the USIM activation response message from the authentication server 300 may check whether data is received from the rightful server via the cryptogram authentication (S210). In detail, the mobile terminal 100 may encrypt the second TRN received from the authentication server 300 using the initial key to generate the preliminary cryptogram and perform authentication of the authentication server 300 according to whether the generated preliminary cryptogram is equal to the second cryptogram.

When the authentication server 300 is completely authenticated, the mobile terminal 100 may extract the MAC key from the first encrypted data and store the extracted MAC key in the USIM (S211). In detail, the mobile terminal 100 may decrypt the first encrypted data received from the authentication server 300 using the initial key stored in the USIM to extract the MAC key.

Then, the mobile terminal 100 may generate a third TRN, encrypt the third TRN using the initial key to generate a third cryptogram (S212), and transmit a transaction key issue request message including the third TRN and the third cryptogram to the authentication server 300 (S213).

The authentication server 300 that receives the transaction key issue request message from the mobile terminal 100 may perform cryptogram authentication (S214). In detail, the authentication server 300 may encrypt the identity information of the USIM to generate the preliminary initial key and encrypt the third TRN received from the mobile terminal 100 using the generated preliminary initial key to generate the preliminary cryptogram. Then, the authentication server 300 may perform cryptogram authentication according to whether the generated preliminary cryptogram is equal to the third cryptogram.

When the cryptogram authentication is completed, the authentication server 300 may generate a fourth TRN, encrypt the fourth TRN using the preliminary initial key to generate a fourth cryptogram, and encrypt a transaction key to be issued to the mobile terminal 100 using the preliminary initial key to generate second encrypted data (S215). The authentication server 300 may transmit a transaction key issue response message including the fourth TRN, the fourth cryptogram, and the second encrypted data to the mobile terminal 100 (S216).

The mobile terminal 100 that receives the transaction key issue response message from the authentication server 300 may check whether data is received from the rightful server via the cryptogram authentication (S217). In detail, the mobile terminal 100 may encrypt the fourth TRN received from the authentication server 300 using the initial key to generate the preliminary cryptogram and perform authentication of the authentication server 300 according to whether the generated preliminary cryptogram is equal to the fourth cryptogram. When the authentication server 300 is completely authenticated, the mobile terminal 100 may extract a transaction key from the second encrypted data and store the extracted transaction key in the USIM (S218). In detail, the mobile terminal 100 may decrypt the second encrypted data received from the authentication server 300 using the initial key stored in the USIM to extract the transaction key.

Then, the mobile terminal 100 may perform mobile payment using the MAC key for checking data integrity and the transaction key for transaction authentication.

A mobile payment method of a mobile terminal using a MAC key and a transaction key will be described below. FIG. 3 is a flowchart of a mobile payment method. For convenience of description, the method will be described in terms of a case in which a USIM 150 and the mobile terminal 100 are separated from each other. However, this is merely for convenience of description. That is, a function of the USIM 150 may be performed by a first controller of the mobile terminal 100.

Figure 3A:
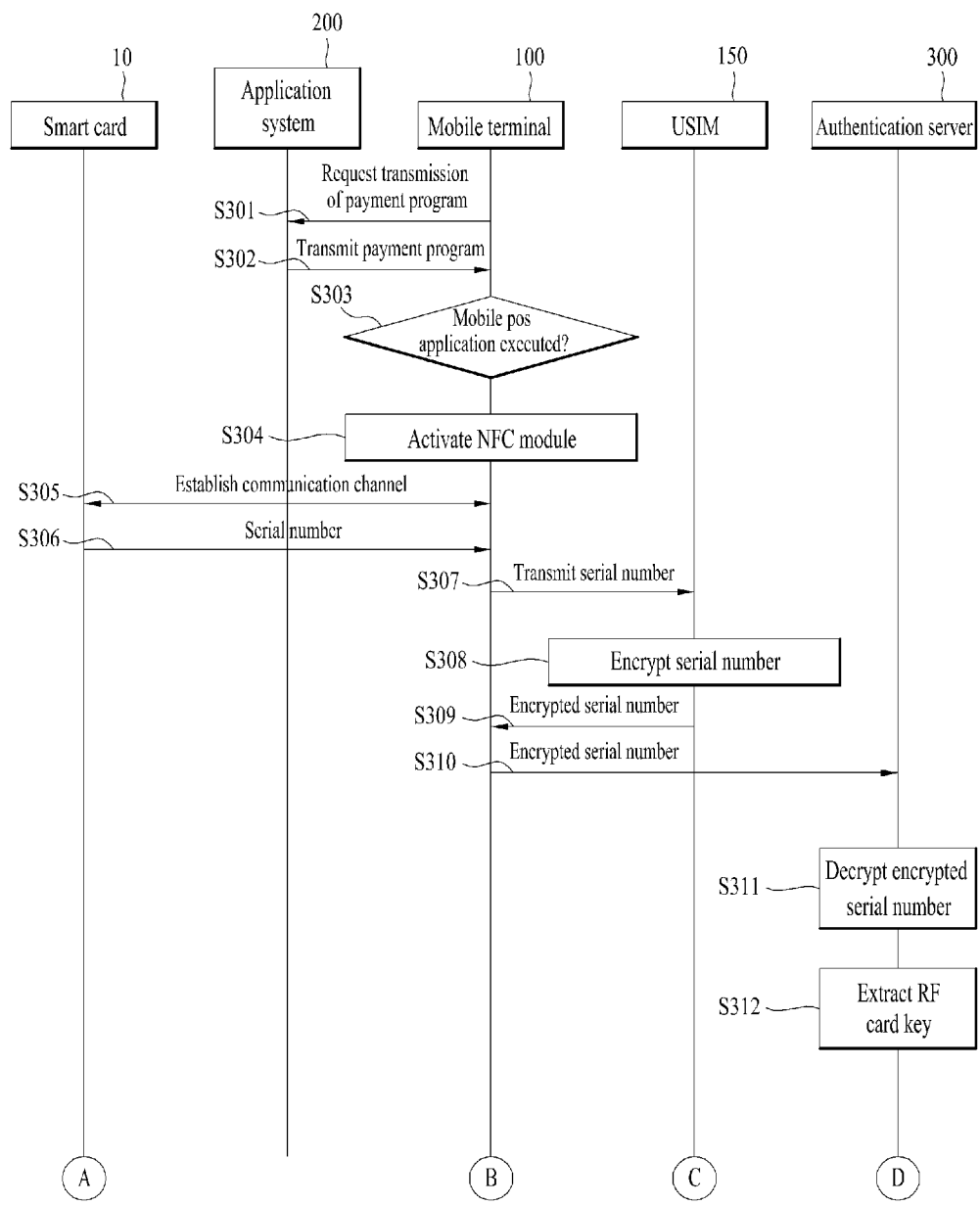

In addition, a character string A to D illustrated in a lower portion of FIG. 3A is indicated to show that operations of the smart card 10, the mobile terminal 100, USIM 150, and the authentication server 300 of FIG. 3A are also continuously performed in FIG. 3B. In addition, A to D illustrated in an upper portion of FIG. 3B indicate respective operations of the smart card 10, the mobile terminal 100, the USIM 150, and the authentication server 300, which means that the operations of FIGS. 3A and 3B are contiguously performed.

Referring to FIG. 3, the mobile terminal 100 that intends to use a mobile payment service may request the application system 200 to transmit a payment program for mobile payment (S301). The application system 200 may transmit the payment program to the mobile terminal 100 in response to the transmission request from the mobile terminal 100 (S302).

Upon providing the payment program to the mobile terminal 100, the application system 200 may provide a mobile POS application and an applet associated with a mobile POS application and an encryption module. Here, the mobile POS application may refer to a program that provides a user interface (UI) for using the mobile terminal 100 as a payment processor (or a POS device).

In detail, the market server 220 of the application system 200 may transmit the mobile POS application to the mobile terminal 100 in response to the transmission request and request an applet management system to transmit the applet associated with the mobile POS application. Then, the applet management system may transmit the applet associated with the mobile POS application to the USIM 150 of the mobile terminal 100 through the OTA server 260.

That is, the application system 200 may provide the mobile POS application and the applet to the mobile terminal 100 in response to the transmission request of the mobile terminal 100.

Then, when the mobile POS application is executed through the mobile terminal 100 (S303), the mobile terminal 100 may control a near field communication (NFC) module to be automatically activated for short-distance communication with the smart card 10 when the NFC module is deactivated (S304).

The mobile terminal 100 may set a communication mode of the NFC module to any one of a card emulation mode, read/write mode, and a P2P mode. The mobile terminal 100 according to the present invention may control the NFC module to be set to the read/write mode upon automatically activating the NFC module such that the mobile terminal 100 may be able to read data from the smart card 10.

Then, when the mobile terminal 100 is tagged with the smart card 10, the mobile terminal 100 may establish a communication channel with the smart card 10 (S305) and receive a serial number of the smart card 10 from the smart card 10 through the established communication channel (S306). Upon receiving the serial number from the smart card 10, the mobile terminal 100 may transmit the received serial number to the USIM 150 (S307). In this case, communication between the mobile terminal 100 and the USIM 150 may be implemented using, but is not limited to, a single wire protocol (SWP) method.

When the USIM 150 encrypts the serial number using the RF master key via an encryption module included in the applet (S308), the mobile terminal 100 may provide the encrypted serial number to the authentication server 300 (S309,S310).

The authentication server 300 that receives the encrypted serial number from the mobile terminal 100 may decrypt the encrypted serial number using the RF card master key (S311), authenticate the smart card 10 using the decrypted serial number, and extract an RF card key for access to the memory region of the smart card 10 (S312). Then, the authentication server 300 may encrypt the RF card key using the RF master key (S313). The encrypted RF card key may be provided to the USIM 150 through the mobile terminal 100 (S314 and S315).

When the USIM 150 decrypts the encrypted RF card key using the RF card master key (S316), the mobile terminal 100 may receive the RF card key from the USIM 150 (S317) and provide the RF card key to the smart card 10 (S318).

When the smart card 10 authenticates the RF card key received from the mobile terminal 100 (S319), if the received RF card key is admitted to be rightful, the smart card 10 may convert status of the memory region into a read state so that the mobile terminal 100 could enable access to the memory region that stores payment information (S320).

When the memory region of the smart card 10 is changed into a read state, the mobile terminal 100 may receive the payment information from the smart card 10 (S321). Here, the payment information of the smart card 10 may include at least one of balance information and card number of the smart card 10.

Then, the mobile terminal 100 may combine the payment information and the sale information input by the user and transmit the combined information to the relay system 400 (S322). Here, the sale information may include at least one of a name of a product to be purchased, the number of products to be purchased, a purchase date, and franchise number.

The relay system 400 may transmit the sale information and the payment information received from the mobile terminal 100 to the card company server 500 (S323). The card company server 500 may authenticate the smart card 10 and the mobile terminal 100 based on the payment information and the sale information, respectively, and determine whether a payment process is authenticated (S324). When the payment process is authenticated, the card company server 500 may provide a receipt to the mobile terminal 100 in the form of message (S325). In this case, as described above, the receipt may be provided to the mobile terminal 100 and may be in the form of an in-app push message or multimedia message service (MMS) message including a receipt image.

FIG. 3 illustrates an example in which the USIM 150 encrypts the serial number of the RF card using the RF card master key and provides the encrypted serial number to the authentication server 300. In this case, for strengthening of security, the USIM 150 may double-encrypt the serial number encrypted using the RF card master key and a transaction key. And then the mobile terminal 100 may transmit the double-encrypted serial number to the authentication server 300. In this case, the authentication server 300 that receives the double-encrypted serial number may primarily decrypt the double-decrypted serial number using the transaction master key and then secondarily decrypt the double-decrypted serial number using the RF card master key to extract the serial number.

In detail, when the RF card key is double-encrypted, the mobile terminal 100 may further transmit the identity information of the USIM to the authentication server 300. The authentication server 300 may encrypt the USIM using the transaction master key, generate a preliminary transaction key, and sequentially decrypt the double encrypted serial numbers using the generated preliminary transaction key and RF card master key.

A method of issuing a transaction key to the mobile terminal 100 has been described in detail with reference to FIG. 2 and a detailed description thereof is omitted here.

In the aforementioned example, the authentication server 300 may simultaneously perform a function (refer to FIG. 2) of issuing the transaction key to the mobile terminal 100 and a function (refer to FIG. 3) of authenticating the smart card 10 and the mobile terminal 100 based on the encrypted information. As another example, a server for issuing the transaction key to the mobile terminal 100 and a server for authenticating the smart card 10 and the mobile terminal 100 based on the encrypted information may be configured as separate server devices.

Although not illustrated in FIGS. 1 to 3, the mobile terminal 100 and the authentication server 300 may perform data communication via a payment gateway (PG) server. The PG server may be managed by a PG company and may relay the encrypted information received from the mobile terminal 100 to the authentication server 300, or relay the payment information received from the authentication server 300 to the relay system 400.

Hereinafter, the mobile terminal 100 and the authentication server 300 illustrated in FIGS. 1 to 3 will be described in detail.

Figure 4:
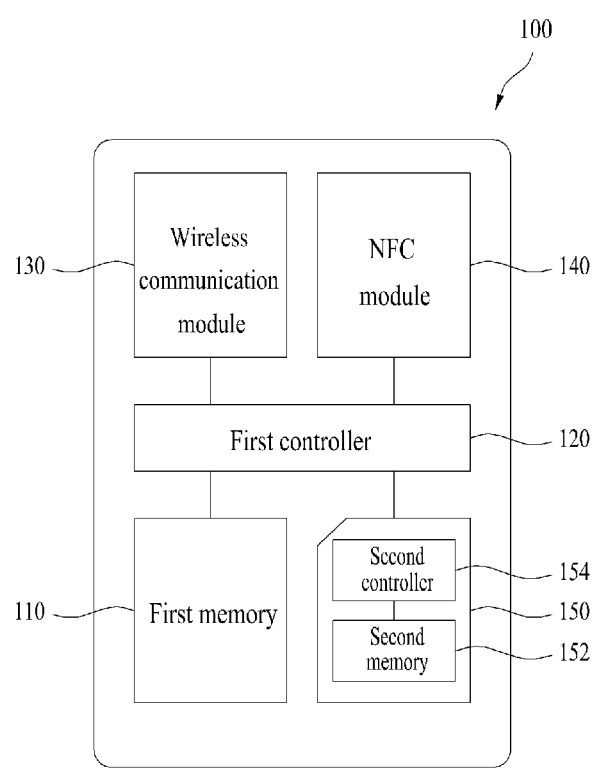
FIG. 4 is a block diagram of a mobile terminal illustrated in FIG. 1.

FIG. 4 is a block diagram of the mobile terminal 100 illustrated in FIG. 1. Referring to FIG. 4, the mobile terminal 100 may include a first memory 110, a first controller 120, a wireless communication module 130, an NFC module 140, and a USIM 150. The USIM 150 may include a second controller 154 and a second memory 152.

The first memory 110 may store a mobile POS application for processing and controlling the first controller 120 and temporarily store input/output data (e.g., serial number, encrypted serial number, etc.). Furthermore, the first memory 110 may store the sale information input by the user.

The first memory 110 may include at least one of a flash memory type storage medium, a hard disc type storage medium, a multimedia card micro type storage medium, a card type memory (e.g., SD, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The first controller 120 may execute a mobile POS application and control an overall operation of the mobile terminal 100. When the mobile POS application is executed, the first controller 120 may control the NFC module 140 to be automatically activated and to operate in read/write mode.

The wireless communication module 130 is provided for communication with the authentication server 300. The wireless communication module 130 may use a mobile communication network such as LTE, WCDMA, HSPA, CDMA, EVDO, etc. or perform wireless communication using a wireless Internet communication network such as WLAN, WiBro, WiMax, etc.

The NFC module 140 is provided for short-distance communication with the smart card 10. The NFC module 140 may be set to at least one of a card emulation mode, read/write mode, and a P2P mode. The card emulation mode is a mode in which the mobile terminal 100 takes a role of smart card 10. The read/write mode is a mode in which the RFID tag information can be read from the smart card 10. That is, the mobile terminal 100 acts as a card reader when the NFC module 140 is in read/write mode. The P2P mode is a mode in which two or more NFC modules 140 transmit data therebetween. When the mobile POS application is executed, the NFC module 140 may be automatically set to read/write mode. Furthermore, the NFC module 140 and the USIM 150 may perform data communication using a SWP, but the present invention is not limited thereto.

The second memory 152 of the USIM 150 stores an applet including an encryption module for processing and control of the second controller 154 and an RF card master key. Furthermore, the second memory 152 may further store a transaction key.

The RF card master key and the transaction key are stored in the second memory 152 of a USIM 150 with a high security level, but not in the first memory 110, thereby preventing exposure of the RF card master key and the transaction key.

The second controller 154 may execute the applet stored in the second memory 152, encrypt the serial number received from the smart card 10 received from the smart card 10 through the encryption module of the applet, and decrypt the RF card key.

According to another embodiment of the present invention, needless to say, the first memory 110 and the first controller 120 can perform functions of the second memory 152 and the second controller 154 of the USIM 150, instead thereof. In this case, the encryption module may be included in the mobile POS application instead of the applet, and the transaction key and the RF card master key used to encrypt a serial number and decrypt the RF card key may be stored in the first memory 110. In this case, the first controller 120 may encrypt the serial number and decrypt the RF card key using the RF master card and transaction key stored in the first memory 110 while driving the mobile POS application including the encryption module.

Figure 5:
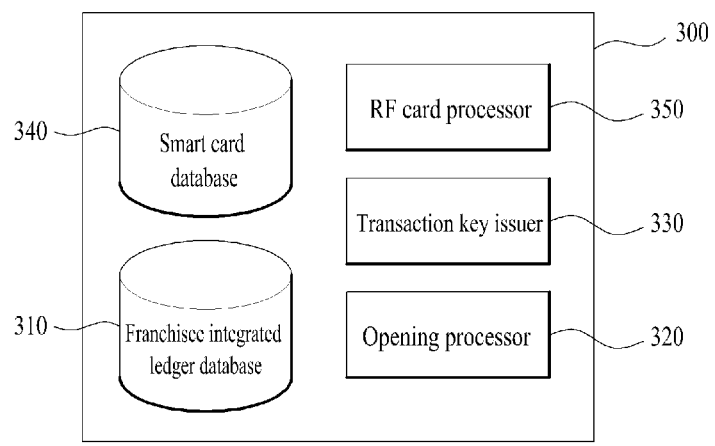
FIG. 5 is a block diagram of an authentication server illustrated in FIG. 1.

FIG. 5 is a block diagram of the authentication server 300 illustrated in FIG. 1. Referring to FIG. 5, the authentication server 300 may include a franchisee integrated ledger database 310, an opening processor 320, a transaction key issuer 330, a smart card database 340, and an RF card processor 350.

The franchisee integrated ledger database 310 stores data obtained by mapping franchisee ledgers of a plurality of franchisees registered in the franchisee management server 600 and the identity information of the mobile terminal 100.

Upon receiving a USIM activation request message from the mobile terminal 100, the opening processor 320 authenticates the mobile terminal 100 and authenticates a first cryptogram contained in the USIM activation request message, based on the franchisee integrated ledger database 310. Additionally, the opening processor 320 may transmit a USIM activation response message including a second cryptogram and first encrypted data and issue a MAC key to the mobile terminal 100, in response to the USIM activation request message.

The transaction key issuer 330 issues a transaction key to the mobile terminal 100. In detail, upon receiving a transaction key issue request message from the mobile terminal 100, the transaction key issuer 330 may authenticate a third cryptogram included in the transaction key issue request message. When the third cryptogram is completely authenticated, the transaction key issuer 330 may transmit a transaction key issue response message including a fourth cryptogram and second encrypted data to the mobile terminal 100 in response to the transaction key issue request message.

The smart card database 340 maps and stores a serial number of the smart card 10 and an RF card key for access to a memory region of the smart card 10.

Upon receiving the encrypted serial number from the mobile terminal 100, the RF card processor 350 decrypts the encrypted serial number using the RF card master key. When the serial number is double-encrypted through the RF card key and the transaction key, the RF card processor 350 may decrypt the encrypted serial number using both the RF card master key and the transaction master key. Then, the RF card processor 350 may authenticate the smart card 10 using the decrypted serial number and extract the RF card key mapped to the decrypted serial number from the smart card database 340. Then, the RF card processor 350 may encrypt the extracted RF card key using the RF card master key and transmit the encrypted RF card key to the mobile terminal 100.

Hereinafter, a mobile payment system between mobile terminals will be described in detail with regard to Embodiment 2.

Embodiment 2

Mobile Payment System Between Mobile Terminals

Embodiment 2 relates to a mobile payment system between mobile terminals. For convenience of description, in the following example, two mobile terminals that participate in mobile payment will be referred to as a purchaser terminal 100-1 and a seller terminal 100-2, respectively.

Figure 6:
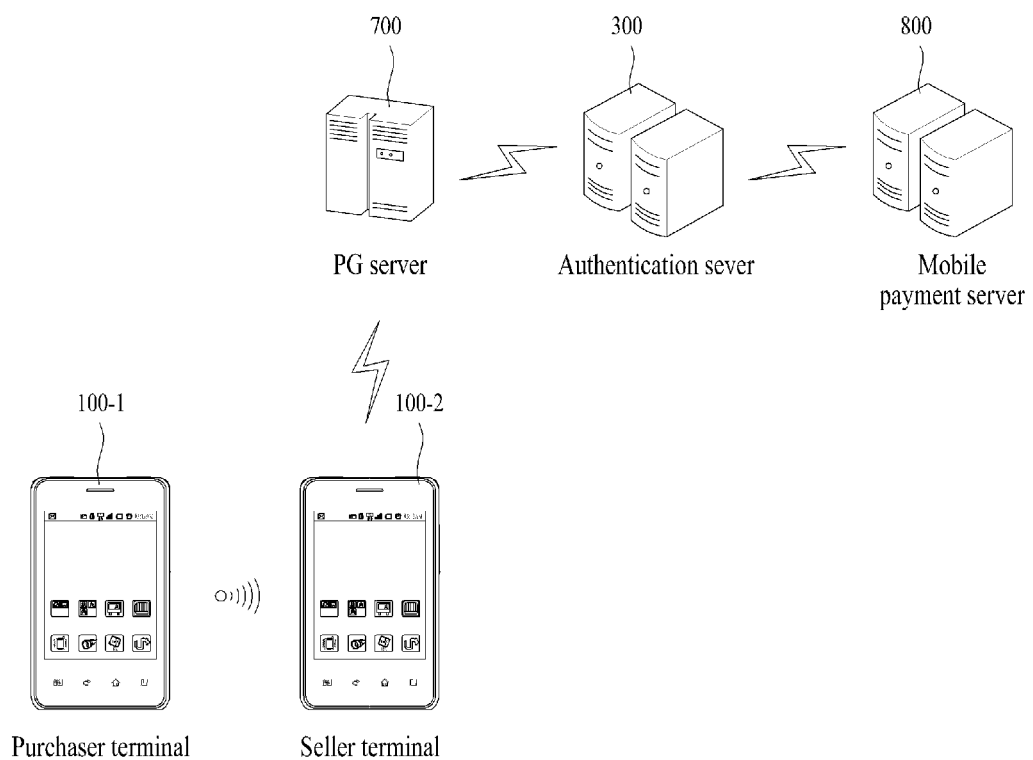
FIG. 6 is a schematic diagram of a mobile payment system according to an embodiment of the present invention.

FIG. 6 is a schematic diagram of a mobile payment system according to an embodiment of the present invention. The mobile terminal 100 and the authentication server 300 of FIG. 1 may be applied to the mobile payment system between the mobile terminals without change. However, the mobile terminal 100 and the authentication server 300 of FIG. 6, to be described below, do not have to be the same as the mobile terminal 100 and the authentication server 300 of FIG. 1.

Referring to FIG. 6, the mobile payment system according to the present invention may include the purchaser terminal 100-1, the seller terminal 100-2, a PG server 700, the authentication server 300, and a mobile payment server 800.

In the example illustrated in FIG. 6, the purchaser terminal 100-1 may store authentication information used to receive initial authentication number from the authentication server 300 and payment information used for micro payment (e.g., mobile phone micro payment) and may drive a mobile wallet application for requesting mobile payment using the stored payment information. Here, the mobile wallet application may refer to a program that provides a UI for using the mobile terminal 100 as a payment requestor. The seller terminal 100-2 may encrypt the payment information received from the purchaser terminal 100-1, generate product information of a product to be purchased by a purchaser, and drive a mobile POS application for requesting the PG server 700 to authenticate the payment information and the product information. Here, the mobile POS application may refer to a program that provides a UI for using the mobile terminal 100 as a payment processor (or a POS device). The PG server 700 may be managed by a PG company and may relay the authentication information received from the purchaser terminal 100-1 or the payment information and product information received from the seller terminal 100-2 to the authentication server 300.

The authentication server 300 authenticates whether the purchaser terminal 100-1 is a rightful subscriber based on the authentication information received from the PG server 700. When the purchaser terminal 100-1 is authenticated, the authentication server 300 may provide the authenticate number to the purchaser terminal 100-1 or provide the payment information and the product information received from the PG server 700 to the mobile payment server 800.

The mobile payment server 800 may receive the payment information and the product information transmitted from the authentication server 300, process payment, and transmits the payment result as a reply. In this case, when payment limit of the purchaser is set, the mobile payment server 800 may determine whether payment is warranted based on the payment limit of the purchaser. Furthermore, the mobile payment server 800 may determine whether payment is warranted based on whether payment is overdue.

An operation of the mobile payment system illustrated in FIG. 6 will be described in more detail with reference to a flowchart of FIG. 7. Before a description with reference to FIG. 7, it is assumed that the purchaser terminal 100-1 that drives a mobile wallet application program stores a mobile wallet key and an authentication server key and that the seller terminal 100-2 that drives the mobile POS application stores a mobile wallet master key and a transaction key. Furthermore, it is assumed that the authentication server 300 stores a mobile wallet master key, a transaction master key, and an authentication server master key.

Here, the mobile wallet key and authentication server key stored in the purchaser terminal 100-1 may be derived from the mobile wallet master key and the authentication server master key, respectively, and received from at least one of the seller terminal 100-2 and the authentication server 300. Furthermore, the transaction key stored in the seller terminal 100-2 may be derived from the transaction master key and received from the authentication server 300. A method of issuing the transaction key has been described with reference to FIG. 1, and thus, a detailed description thereof is not given here.

The seller terminal 100-2 or the authentication server 300 may derive the mobile wallet key from the mobile wallet master key, based on a temporal parameter or identity information of the purchaser terminal 100-1. Here, the identity information of the purchaser terminal 100-1 may include at least one of a CTN of the purchaser terminal 100-1, an IMEI, an IMSI, and identity information (e.g., CSN of a USIM) of a USIM allocated to the purchaser terminal 100-1.

Similarly, the authentication server 300 may derive the transaction key from the transaction master key, based on a temporal parameter or identity information of the seller terminal 100-2. Here, the identity information may include at least one of a CTN of the seller terminal 100-2, an IMEI, an IMSI, and identity information of a USIM allocated to the seller terminal 100-2.

The mobile wallet key may include a payment information encryption key for encryption of payment information and a first authentication key for generating the first cryptogram and a first message attestation code (MAC), which will be described below.

In addition, the transaction key may include a product information encryption key for encryption of first step encryption information and product information, and a second authentication key for generating the second cryptogram and a second MAC.

Lastly, the authentication server key may be used to generate a signature.

Based on the aforementioned assumption, a mobile payment method according to the present invention will be described in detail.

Figure 7A:
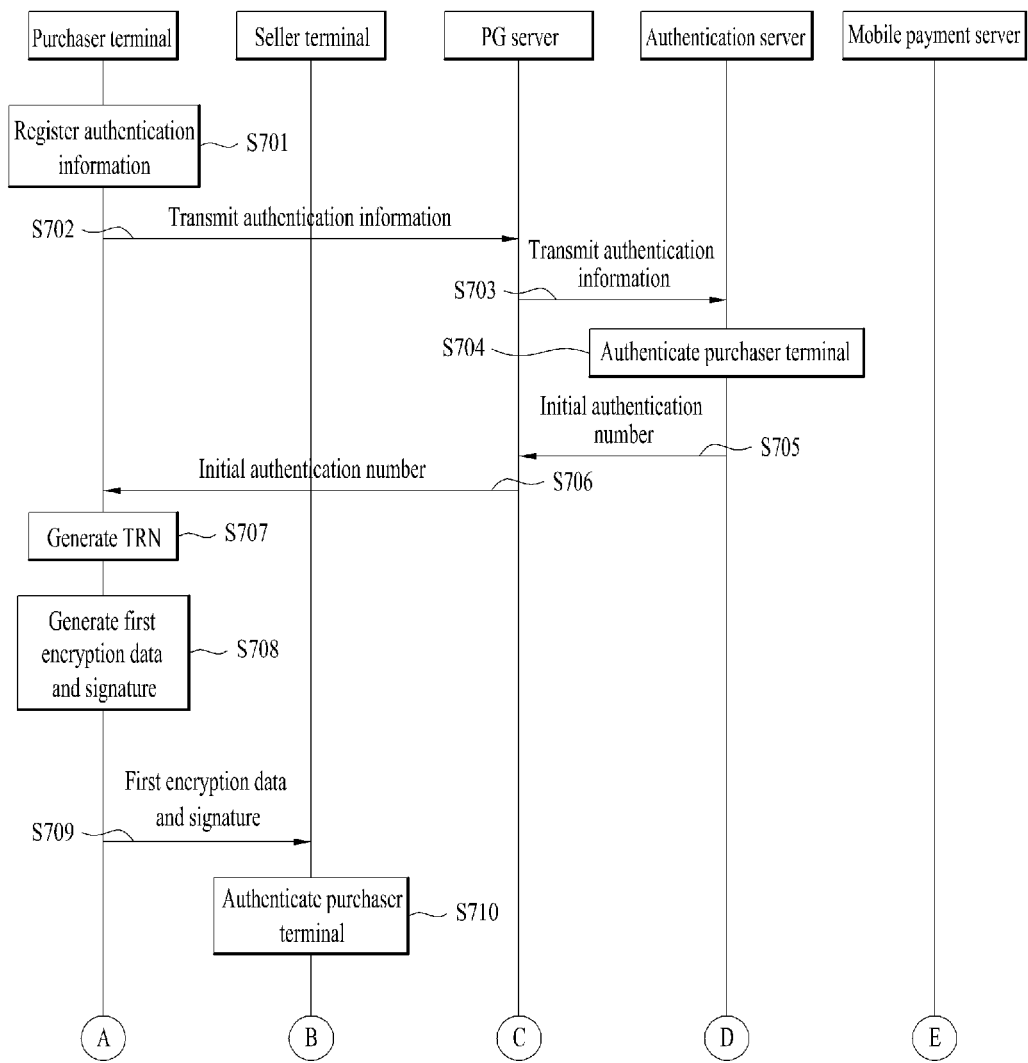
FIGS. 7a and 7b illustrate a flowchart of a mobile payment method according to an embodiment of the present invention.
Figure 7B:
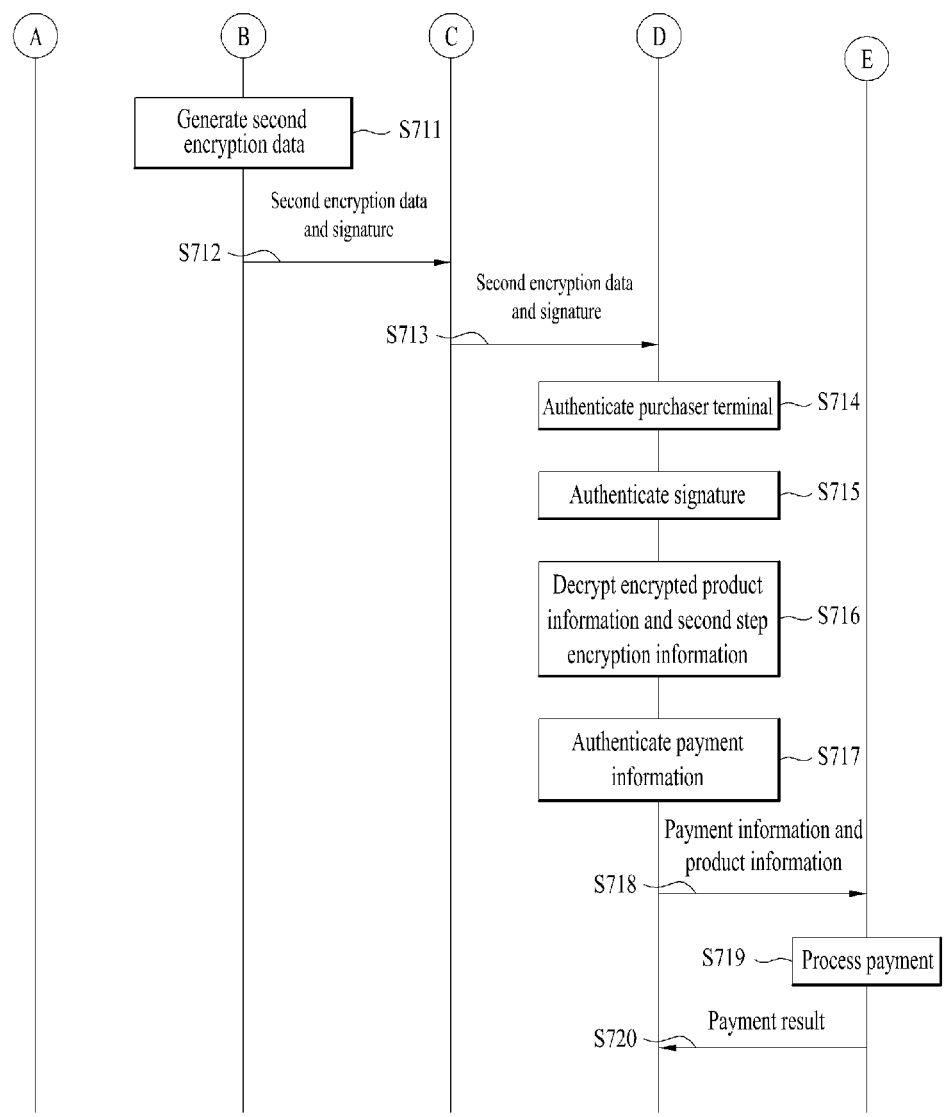

FIG. 7 is a flowchart of a mobile payment method. A character string A to E illustrated in a lower portion of FIG. 7A is indicated to be connected to a character string A to E illustrated in an upper portion of FIG. 7B. Referring to FIG. 7, a purchaser who wants to use a mobile payment service may input authentication information to the purchaser terminal 100-1 (S701) and transmit the registered authentication to the authentication server 300 through the PG server 700 (S702 and S703). Here, the authentication information may include at least one of identity information of a mobile communication company to which the purchaser terminal 100-1 subscribes, a CTN of the purchaser terminal 100-1, and identity information of the purchaser. The identity information of the purchaser may include at least one of a name of the purchaser, a resident registration number of the purchaser, and a network ID or password of the purchaser, registered in the authentication server 300 or a third server (e.g., an I-PIN management server, etc.).

The authentication server 300 that receives the authentication information from the purchaser terminal 100-1 authenticates the authentication information (S704), and when the authentication information is rightful, the authentication server 300 may transmit initial authentication number to the purchaser terminal 100-1 through the PG server 700 (S705 and S706). In detail, the authentication server 300 may authenticate the authentication information using an authentication database or authenticate the authentication information in conjunction with a mobile communication company server (not shown) or a third server (not shown). When the payment information is authenticated in conjunction with the mobile communication company server, the authentication server 300 may inquire of a server of a mobile communication company to which the purchaser terminal 100-1 subscribes as to whether the telephone number and identity number of the purchaser correspond to the CTN of the purchaser terminal 100-1. Here, the initial authentication number may be transmitted to the purchaser terminal 100-1 in the form of short message service (SMS) message, and the initial authentication number may be a character string of six or more (or less) characters.

The authentication processes S702 to S706 of the purchaser terminal 100-1 may be performed whenever the purchaser terminal 100-1 uses a mobile payment service, which is not always needed. According to another embodiment, the initial authentication number which is issued initially can be used every repeated payment. As another example, the mobile payment system may be configured in such a way that the purchaser terminal 100-1 automatically performs an authentication process at a predetermined frequency so as to periodically update the initial authentication number.

Then, when the purchaser who wants to use mobile payment registers payment information in the purchaser terminal 100-1 and requests the mobile payment, the purchaser terminal 100-1 may generate a TRN (S707) and generate first encrypted data based on the mobile wallet key (S708). Here, the payment information may be personal information required to make micro payment and may include telephone number of the purchaser terminal 100-1 and the identity of the purchaser. As described above, the identity of the purchaser may include at least one of a name of the purchaser, a resident registration number of the purchaser, and a network ID or password of the purchaser, registered in the authentication server 300 or a third server (e.g., an I-PIN management server, etc.). Furthermore, the first encrypted data may further include the first MAC and first cryptogram generated using the mobile wallet key (in detail, a first authentication key) and a signature generated using the authentication server key, in addition to first step encryption information formed by encrypting a combination of a TRN, an initial authentication number, and payment information using the mobile wallet key (in detail, payment information encryption key of the mobile wallet key). The signature may be used to authenticate the purchaser by the authentication server 300 and may be an electronic signature for an electronic document.

Then, the purchaser terminal 100-1 may transmit the first encrypted data and the signature to the seller terminal 100-2 via NFC communication (S709). The seller terminal 100-2 that receives various data from the purchaser terminal 100-1 may decrypt the first cryptogram and/or first MAC received from the purchaser terminal 100-1 using the mobile wallet master key to authenticate the purchaser terminal 100-1 (S710). In this case, the seller terminal 100-2 may decrypt only minimum data required to authenticate the purchaser terminal 100-1. That is, the seller terminal 100-2 may not decrypt the first step encryption information and the signature but may decrypt only the first cryptogram and/or first MAC used to authenticate the purchaser terminal 100-1. In this case, the first cryptogram may be used to authenticate whether the purchaser terminal 100-1 is a rightful purchaser and the first MAC may be used to authenticate whether data is modulated during data communication between the purchaser terminal 100-1 and the seller terminal 100-2.

When the purchaser terminal 100-1 is authenticated, the seller terminal 100-2 may generate second encrypted data based on the transaction key (S711). Here, the second encrypted data may further include at least one of the second MAC and second cryptogram generated using the transaction key (in detail, a second authentication key), in addition to second step authentication information and sale information obtained by encrypting the first step encryption information and the sale information input by a purchaser using the transaction key (in detail, a production information encryption key). Then, the seller terminal 100-2 may transmit the second encrypted data and the signature to the authentication server 300. Upon being transmitted to the authentication server 300, the aforementioned data may be transmitted to the authentication server 300 through the PG server 700 (S712 and S713).

Here, the sale information input to the seller terminal 100-2 may include a payment request sum and may further include a product name, a number of products, a unit price, a purchase date, and franchisee number.

The authentication server 300 that receives the various data from the seller terminal 100-2 may decrypt the second cryptogram and/or the second MAC using the transaction master key to authenticate the seller terminal 100-2 (S714). Here, the second cryptogram may be used to authenticate whether the seller terminal 100-2 is a rightful purchaser and the second MAC may be used to authenticate whether data is modulated during data communication between the seller terminal 100-2 and the authentication server 300.

Once the seller terminal 100-2 is authenticated, if a seller of the seller terminal 100-2 is rightful, the authentication server 300 may authenticate a signature through the authentication server master key (S715). In detail, the authentication server 300 may identify a signer and check whether the signature is forged or falsified, through the authentication server master key.

When the signature is completely authenticated, the authentication server 300 may decrypt the encrypted product information using the transaction master key, decrypt the second step encryption information using the transaction master key and the mobile wallet master key (S716), and then, authenticate the payment information (S717). In detail, the authentication server 300 may check whether the initial authentication information extracted by decrypting the second step encryption information corresponds to the telephone number of the purchaser terminal 100-1 and the identity information of the purchaser to check whether the payment information is rightful.

When the payment information is completely authenticated, the authentication server 300 may transmit the decrypted payment information and the decrypted product information to the mobile payment server 800 (S718). The mobile payment server 800 may process payment using the transmitted payment information and product information (S719) and transmit a processing result as a reply (S720).

In case of mobile payment, a payment amount limit may be set by the purchaser every month. Accordingly, the mobile payment server 800 may compare balance of the payment amount limit with the payment request sum to determine whether payment is approved. For example, when the payment request sum is less than the balance of the payment amount limit, the payment is approved. In an opposite case, the payment may not be approved. Furthermore, the mobile payment server 800 may use an overdue list of the purchaser as a factor for determining whether the payment is approved. In detail, the payment is not approved in at least one of a case in which payment of the purchaser is overdue, a case in which an overdue amount is a predetermined sum or more, and a case in which an overdue period of time of the purchaser is a predetermined period of time or more.

Then, the authentication server 300 that receives a processing result from the mobile payment server 800 may be controlled to transmit a payment history to the seller terminal 100-2 and/or the purchaser terminal 100-1 through the PG server 700 to complete a mobile payment process.

Here, the authentication server 300 may transmit the payment history to the seller terminal 100-2 and/or the purchaser terminal 100-1 in the form of an SMS message. Here, the SMS message may be transmitted in the form of multimedia message service (MMS) including a receipt image or in the form of an in-app push message, but the present invention is not limited thereto.

FIG. 7 illustrates an example in which the purchaser terminal 100-1 and the authentication server 300, and the seller terminal 100-2 and the authentication server 300 perform data communication through the PG server 700. Unlike in the example illustrated in FIG. 7, at least one of the purchaser terminal 100-1 and the seller terminal 100-2 may communicate with the authentication server 300 without through the PG server 700.

The operations of the purchaser terminal 100-1 and the seller terminal 100-2, described with reference to FIG. 7, may be performed by driving the mobile wallet application and the mobile POS application, respectively. In detail, when the initial mobile wallet application is executed in the purchaser terminal 100-1, the purchaser terminal 100-1 may be controlled to perform a process (S701) of receiving authentication information from the purchaser. When the initial mobile wallet application is executed at the second time, the purchaser terminal 100-1 may await mobile payment request of the purchaser, and when the purchaser requests mobile payment, the purchaser terminal 100-1 may be controlled to generate a TRN (S707).

Furthermore, the seller terminal 100-2 may drive the mobile POS application to receive the first encrypted data and the signature from the purchaser terminal 100-1.

In order to control the purchaser terminal 100-1 and the seller terminal 100-2 to smoothly perform data communication, the purchaser terminal 100-1 and the seller terminal 100-2 may control an NFC module to be automatically activated so as to perform NFC communication with an opposite side. In detail, when the purchaser terminal 100-1 and the seller terminal 100-2 drive the mobile wallet application and the mobile POS application, respectively, the purchaser terminal 100-1 and the seller terminal 100-2 may control the NFC module to be automatically activated.

The NFC module may be set to a card emulation mode, read/write mode, or a P2P mode. The purchaser terminal 100-1 and the seller terminal 100-2 may control the NFC module to be set in a P2P mode while activating the NFC module.

When the mobile wallet application is driven, if the NFC module of the purchaser terminal 100-1 is activated, the purchaser terminal 100-1 may adjust an operation mode of the NFC module to a P2P mode.

Similarly, when the mobile POS application is driven, if the NFC module of the seller terminal 100-2 is activated, the seller terminal 100-2 may adjust an operation mode of the NFC module to a P2P mode.

FIG. 7 illustrates an example in which the authentication server 300 authenticates the seller terminal 100-2 (S714), authenticates a signature (S715), performs decryption (S716) and authenticates payment information (217).

Here, steps S714 and S715 to S717 may be simultaneously performed in parallel, or step S714 may be performed between random two of steps S715 to S717 or after step S717.

Furthermore, the signature authentication (S715) and the decryption (S716) may be simultaneously performed in parallel, or the order of the steps may be reversed.

Hereinafter, a structure of the purchaser terminal 100-1 for driving the mobile wallet application will be described in detail.

Figure 8:
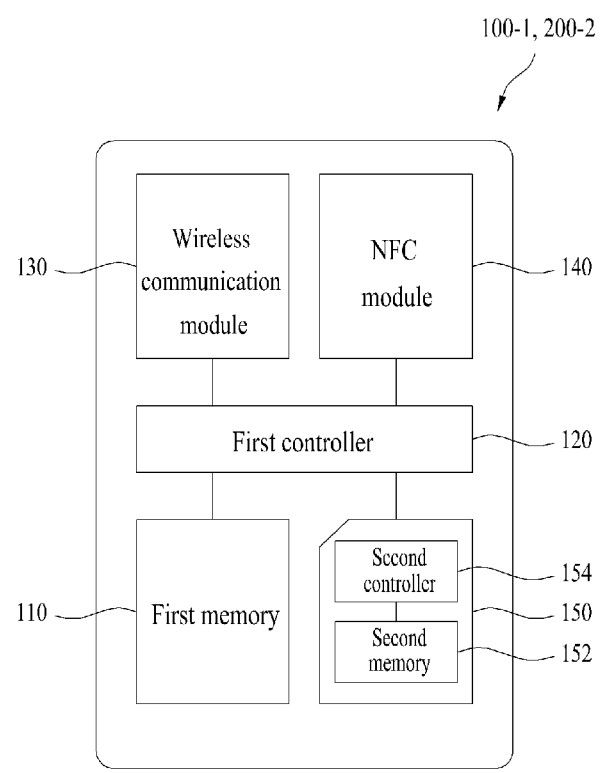
FIG. 8 is a block diagram of a purchaser terminal illustrated in FIG. 1.

FIG. 8 is a block diagram of the purchaser terminal 100-1 illustrated in FIG. 6. Referring to FIG. 8, the purchaser terminal 100-1 may include the first memory 110, the first controller 120, the wireless communication module 130, the NFC module 140, and the USIM 150. Furthermore, the USIM 150 may include the second controller 154 and the second memory 152.

The first memory 110 may store a mobile wallet application for processing and controlling the first controller 120 and temporarily store input/output data (e.g., first encrypted data). Furthermore, the first memory 110 may store payment information and authentication input by the purchaser.

The first memory 110 may include at least one of a flash memory type storage medium, a hard disc type storage medium, a multimedia card micro type storage medium, a card type memory (e.g., SD, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The first controller 120 may drive a mobile wallet application and control an overall operation of a terminal. When the mobile wallet application is driven, the first controller 120 may control the NFC module 140 to be automatically activated and to operate in a P2P mode.

The wireless communication module 130 is provided for communication with the authentication server 300 (or the PG server 700). The wireless communication module 130 may use a mobile communication network such as LTE, WCDMA, HSPA, CDMA, EVDO, etc. or perform wireless communication using a wireless Internet communication network such as WLAN, WiBro, WiMax, etc.

The NFC module 140 is provided for short-distance communication with the seller terminal 100-2. The NFC module 140 may be set to at least one of a card emulation mode, read/write mode, and a P2P mode. The card emulation mode is a mode in which RFID tag information can be recognized irrespective of on/off of the terminal, and read/write mode is a mode in which the RFID tag information can be recognized when the NFC module 140 is activated, that is, the terminal acts as a card reader. Furthermore, the P2P mode is a mode in which all two or more NFC modules 140 act as card readers to transmit data therebetween. When the mobile wallet application is driven, the NFC module 140 may be automatically set to a P2P mode.

The second memory 152 of the USIM may store the mobile wallet key and the authentication server key and the second controller 154 may generate a TRN and first encrypted data.

The mobile wallet key and the authentication server key are stored in the second memory 152 of a USIM with a high security level, but not in the first memory 110, thereby preventing exposure of the mobile wallet key and the authentication server key. Furthermore, a TRN and second encrypted data may be generated through the second controller 154, but not through the first controller 120, thereby preventing exposure of the TRN and the first encrypted data.

However, needless to say, the first memory 110 and the first controller 120 can perform functions of the second memory 152 and the second controller 154, instead thereof.

The seller terminal 100-2 according to the present invention may include an equivalent component to the purchaser terminal 100-1 illustrated in FIG. 8. Functions of each component of the seller terminal 100-2 in this case will be described hereinafter.

First, the first memory 110 of the seller terminal 100-2 may store a mobile POS application for processing the first controller 120 and temporarily store input/output data (e.g., first encrypted data and second encrypted data).

The first controller 120 of the seller terminal 100-2 may drive the mobile POS application and control an overall operation of the mobile. When the mobile POS application is driven, the first controller 120 may control the NFC module 140 to be automatically activated and to be set to a P2P mode.

The second memory 152 of the seller terminal 100-2 may store the mobile wallet master key and the transaction key. The second controller 154 may partially decrypt the first encrypted data to authenticate the purchaser terminal 100-1 and to generate second encrypted data.

In this case, as described with regard to the purchaser terminal 100-1, the first memory 110 and the first controller 120 can perform functions of the second memory 152 and the second controller 154, instead thereof.

Functions of the wireless communication module 130 of the seller terminal 100-2 and the NFC module 140 are the same as in the purchaser terminal 100-1, and thus, a detailed description thereof is not given here.

As illustrated in FIG. 8, the purchaser terminal 100-1 and the seller terminal 100-2 may include equivalent components. Furthermore, the purchaser terminal 100-1 and the seller terminal 100-2 may be the same type of device, but do not have to be the same type of device.

According to an embodiment of the present invention, the aforementioned mobile payment method can be implemented as a code that can be read by a processor from a medium on which a program is recorded. Examples of a processor readable recording medium may include a ROM, a RAM, a CD-ROM, a magnetic tape, a floppy disc, an optical data storage device, etc. and may be implemented in the form of a carrier wave (e.g., transmission via the Internet).

The present invention can improve user convenience of a mobile terminal.

In detail, the present invention can perform mobile payment via data communication between a mobile terminal and a smart card without a separate payment terminal.

Furthermore, the present invention may provide a mobile terminal that can process a mobile payment request from a smart card without installing a secure application module.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A non-transitory computer-readable storage medium having instructions stored thereon, that when executed cause a system to perform a method for issuing a radio frequency (RF) card key of an authentication server, the method comprising:
receiving, at an authentication server remotely located from a mobile terminal, an authentication request from the mobile terminal, wherein the authentication request includes identity information associated with the mobile terminal;
generating, at the authentication server, an RF card master key based on the identity information;
transmitting, by the authentication server, the RF card master key to the mobile terminal when the mobile terminal is successfully authenticated;
receiving, by the authentication server and in response to the mobile terminal and a smart card establishing a communication channel, an encrypted serial number of the smart card from the mobile terminal, the encrypted serial number being encrypted by the mobile terminal using the RF card master key;
decrypting, by the authentication server, the encrypted serial number using the RF card master key;
authenticating, by the authentication server using a secure application module (SAM) included on the authentication server, the smart card based on the decrypted serial number;
extracting, in response to authenticating the smart card, an RF card key corresponding to the decrypted serial number, wherein the RF card key allows for reading of payment information from the smart card;
encrypting, by the authentication server, the RF card key using the RF card master key; and
configuring the mobile terminal to be able to access the payment information of the smart card without having a SAM stored on the mobile terminal by transmitting, by the authentication server, the encrypted RF card key to the mobile terminal for decryption by the mobile terminal using the RF card master key.

2. The non-transitory computer-readable storage medium according to claim 1, wherein the RF card master key is stored in a universal subscriber identity module (USIM) included in the mobile terminal.

3. The non-transitory computer-readable storage medium according to claim 2, wherein the serial number is double encrypted using the RF card master key and a transaction key stored in the USIM.

4. The non-transitory computer-readable storage medium according to claim 3, wherein the authentication server encrypts identity information of the USIM using the transaction key to generate a preliminary transaction key, and decrypts the encrypted serial number using the generated preliminary transaction key and the RF card master key stored in the authentication server.

5. The non-transitory computer-readable storage medium according to claim 4, wherein the identity information of the USIM comprises a compromisable serial number (CSN) of the USIM.

6. An authentication server comprising:
a smart card database comprising a non-transitory computer-readable storage medium for storing a serial number of smart card mapped to a radio frequency (RF) card key; and
an RF card key processor for decrypting the encrypted serial number, the RF card key processor executing a series of executable instructions stored in the non-transitory computer-readable storage medium which when executed cause the RF card key processor to:
receive an authentication request from a mobile terminal remotely located from the mobile terminal, wherein the authentication request includes identity information associated with the mobile terminal;
generate an RF card master key based on the identity information;
transmit the RF card master key to the mobile terminal when the mobile terminal is successfully authenticated;
receive, in response to the mobile terminal and a smart card establishing a communication channel, an encrypted serial number of the smart card from the mobile terminal, the encrypted serial number being encrypted by the mobile terminal using the RF card master key;
decrypt the encrypted serial number using the RF card master key;
authenticate, using a secure application module (SAM), the smart card based on the decrypted serial number;
extract, in response to authenticating the smart card, an RF card key corresponding to the decrypted serial number from the smart card database, wherein the RF card key allows for reading of payment information from the smart card;
encrypt the RF card key using the RF card master key; and
configure the mobile terminal to be able to access the payment information of the smart card without having a SAM stored on the mobile terminal by transmitting the encrypted RF card key to the mobile terminal for decryption by the mobile terminal using the RF card master key.

7. The authentication server according to claim 6, wherein the RF card master key is stored in a universal subscriber identity module (USIM) included in the mobile terminal.

8. The authentication server according to claim 7, wherein the serial number is double encrypted using the RF card master key and a transaction key stored in the USIM.

9. The authentication server according to claim 8, wherein the RF card key processor encrypts identity information of the USIM using the transaction master key to generate a preliminary transaction key, and decrypts the encrypted serial number using the generated preliminary transaction key and the RF card key stored in the authentication server.

10. The authentication server according to claim 9, wherein the identity information of the USIM comprises a compromisable serial number (CSN) of the USIM.

11. A non-transitory computer-readable storage medium having instructions stored thereon, that when executed cause a system to perform a method, the method comprising:
transmitting, by a mobile terminal, an authentication request to an authentication server, wherein the authentication request includes identity information associated with the mobile terminal;
receiving, at the mobile terminal from the authentication server, an RF card master key in response to the mobile terminal being successfully authenticated by the authentication server, wherein the RF card master key is generated by the authentication server based on the identity information included in the authentication request;

receiving, at the mobile terminal, a serial number from a smart card;

encrypting, at the mobile terminal, the serial number using the RF card master key;

transmitting, by the mobile terminal, the encrypted serial number to the authentication server;

receiving, at the mobile terminal from the authentication server, an encrypted RF card key in response to the authentication server authenticating the smart card based on the serial number using a secure application module (SAM) stored on the authentication server, wherein the mobile terminal is configured to be able to access payment information of the smart card without having a SAM stored on the mobile terminal through reception of the encrypted RF card key;

decrypting the encrypted RF card key using the RF card master key; and extracting payment information from a memory region of the smart card using the RF card key.

12. The non-transitory computer-readable storage medium according to claim 11, further comprising transmitting the payment information and sale information input to the mobile terminal to a card company server.

13. The non-transitory computer-readable storage medium according to claim 12, wherein:
the payment information comprises at least one of balance information and card number of the smart card; and
the sale information comprises at least one of a name of a product to be purchased, a number of products, a purchase date, and franchise number.

14. The non-transitory computer-readable storage medium according to claim 12, further comprising receiving information about whether a payment process is authenticated, from the card company server.

15. The non-transitory computer-readable storage medium according to claim 14, wherein the mobile terminal receives a receipt image from the card company server when the authentication process is authenticated.

16. A mobile terminal including a processor and a non-transitory computer-readable storage medium, the mobile terminal comprising:
a near field communication (NFC) module for data communication with a smart card;
a wireless communication module for data communication with an authentication server for authenticating the mobile terminal and, upon successful authentication with the authentication server, authenticating the smart card based on a secure application module (SAM) included on the authentication server;
a first controller for control of a mobile payment process; and
a universal subscriber identity module (USIM) for encrypting a serial number of the smart card, received from the smart card, and decrypting an encrypted RF card key, received from the authentication server in response to the authentication server authenticating the smart card based on the serial number using a secure application module (SAM) stored on the authentication server, using an RF card master key received from the authentication server upon successful authentication of the mobile terminal, wherein:
the mobile terminal is configured to be able to access payment information of the smart card without having a SAM stored on the mobile terminal through reception of the encrypted RF card key; and
the mobile terminal extracts payment information from a memory region of the smart card using the RF card key.

17. The mobile terminal according to claim 16, wherein the serial number is encrypted by driving an applet stored in the USIM.

* * * * *